United States Patent Office 3,067,002
Patented Dec. 4, 1962

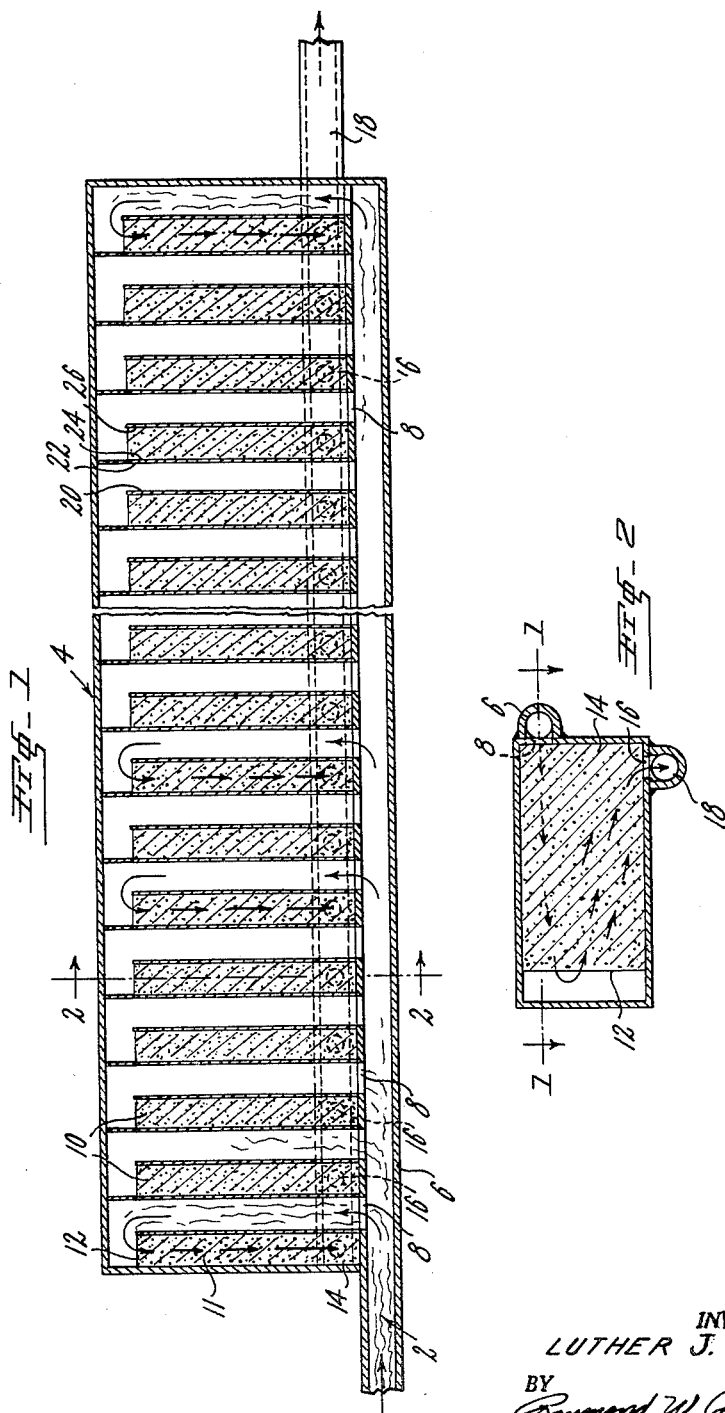

3,067,002
METHOD OF TREATING EXHAUST GASES OF
INTERNAL COMBUSTION ENGINES
Luther J. Reid, Jr., Woodbury, N.J., assignor to Socony
Mobil Oil Company, Inc., a corporation of New York
Filed Mar. 23, 1960, Ser. No. 17,014
3 Claims. (Cl. 23—2)

This invention relates to a method for the oxidation of unburned combustibles in gas and to a gas treating apparatus for the carrying out of this method. More particularly, this invention relates to the catalytic oxidation of unburned or incompletely combusted hydrocarbons and the like in exhaust gas and to an apparatus therefor.

For a long time it has been recognized that the objectionable components of gases such as carbon monoxide, unburned hydrocarbons, smoke and the like contribute to the formation of smog and generally tend to foul the atmosphere. Attempts have been made to remove these odoriferous components by catalytic oxidation, as in a catalytic afterburner for automobile exhaust gas. Prior attempts to utilize the catalytic afterburner have not been very successful, in part, because of the difficulty of maintaining the catalyst at its minimum operating temperature. Catalytic oxidation reactions will proceed only when this minimum temperature is maintained. While the actual operating temperature of the catalyst will vary depending upon such factors as the particular catalyst employed, its activity, and the nature of the oxidizable constituents in the gas stream, usually this temperature will be of the order of at least 500° F. and generally will be within the range of about 500° F. to 1400° F.

In the usual type of catalytic afterburner for automotive exhaust gases the exhaust gas from the engine flows into one end of a catalyst bed, through the bed, and into the tail pipe. When the engine is first turned on the exhaust gases are not very warm and are well below the minimum operating temperature of the catalyst bed, so that incompletely combusted hydrocarbons pass through the catalyst without oxidation and are vented to the atmosphere. As the engine warms up the exhaust gases gradually heat the catalyst up to operating temperature, but during the warm up period considerable fouling of the atmosphere by odoriferous material occurs.

It is therefore an object of this invention to provide a method and apparatus for reducing the concentration of incompletely combusted material in exhaust gases during engine warm up time.

Another object is to provide a method and apparatus for completely oxidizing exhaust combustibles during the initial period of engine warm up.

Additional objects will become apparent from the following detailed description and drawing wherein:

FIG. 1 is a schematic plan view diagram of the flow-reversing catalytic afterburner of this invention taken along line 1—1 of FIG. 2.

FIG. 2 is a cross-section of the afterburner taken along line 2—2 of FIG. 1.

In accordance with one aspect of this invention there is provided a catalytic afterburner in which the initial unburned combustibles are adsorbed as sorbate at one end of the catalyst bed until the other end of the catalyst bed is heated up to its operating temperature, of the order of 500° F. The heating of the catalyst bed is by indirect heat exchange with the hot engine exhaust gas. The entering gas gradually becomes warmer, and this in turn gradually raises the temperature of the bed until the catalyst operating temperature is reached. That end of the bed that is opposite the end containing adsorbed hydrocarbons reaches the catalytic operating temperature first. The hot exhaust gas strips the adsorbed hydrocarbons from the cooler end of the bed, carries them onward to the hotter end of the bed, and complete catalytic oxidation takes place.

The functioning of the afterburner will be more completely understood by reference to FIGS. 1 and 2. When the engine (not shown) is first turned on the exhaust gas 2 enters the afterburner 4 through duct 6. The exhaust gas 2 then flows through ducts 8 between catalyst beds 10 and heats the catalyst 11 by indirect heat exchange. As the exhaust gas passes through ducts 8 with consequent heat transfer to beds 10 the gas is cooled, so that when the gas first enters the ends 12 of the catalyst beds 10 the cool catalyst, which has not yet been heated up to its operating temperature, adsorbs water vapor and unburned combustibles, e.g. hydrocarbons, from the exhaust gas. These are held as sorbate on the catalyst until the opposite ends 14 of the catalyst beds 10 are heated up to operating temperatures by indirect heat exchange with additional hot exhaust gas. As the entering exhaust gas becomes hotter the adsorbed combustibles are stripped from the cooler ends 12 of the catalyst beds 10 and carried to the hotter ends 14 of the beds where catalytic oxidation takes place. The combusted gas then passes through exhaust ports 16, into the tail pipe 18, and out to the atmosphere.

It is important to note that the catalytic afterburner of this invention relies upon indirect heat exchange between exhaust gas and catalyst to bring the catalyst up to operating temperature. This is achieved by reversal of the direction of flow of the exhaust gas, i.e. the flow of gas from the engine and into the afterburner is countercurrent to the flow of gas leaving the afterburner.

Referring again to FIG. 1 and in accordance with another aspect of this invention, a portion of the catalyst 11 at one end 12 of the catalyst bed 10 may, if desired, be replaced with more strongly adsorbent material. If the catalyst is not very effective as an adsorbent, this will insure the holding of initial water vapor and unburned hydrocarbons of the exhaust gas as sorbate on the adsorbent, until the other end 14 of the catalyst bed 10 is heated up to operating temperature.

In accordance with yet another aspect of this invention, in addition to loading the catalyst beds 10 with catalyst, the adjacent ducts 8 may also be filled with catalyst, either partially (e.g. alongside end portion 12 of the catalyst bed) or completely. This provides a longer residence time for the exhaust gas and also promotes retention of the unburned combustibles until the outlet end 14 of the catalyst bed reaches operating temperature.

The catalyst may be made of any material suitable for catalytic oxidation reactions. Pellet type catalysts, which consist of cylindrical shapes of about ⅛" to ¹⁄₁₆" diameter and length and composed of an impregnated form of a catalytic oxide, are well suited for the practice of this invention. Chrome-alumina and vanadia-aluminum catalysts are particularly suitable. Pellets of catalytic alumina impregnated with a minor amount of platinum—the impregnation being accomplished by immersion of the pellets in a solution of chloroplatinic acid followed by thermal decomposition in situ of the solution adhering to the pellets—are also suitable. Alternatively, catalytic forms of other oxides such as beryllia, thoria, and magnesia impregnated with alternative catalytic metals such as copper, palladium, or the like may be employed.

The adsorbent, if one is to be used in conjunction with the catalyst, may be made of certain natural or synthetic zeolites or, more preferably, alumino-silicates, such as alkali metal or alkaline earth metal alumino-silicates, e.g. calcium alumino-silicate. Thus certain alumino-silicates, e.g. sodium and calcium alumino-silicates, exhibit the property of a "molecular sieve," that is, an inorganic material made up of porous crystals wherein the pores of the crystals are of molecular dimension and are of uniform size. Particularly suitable solid adsorbents are the calcium alumino-silicates manufactured by Linde Air Products Company and designated Linde Types 5A and 10X molecular sieves. Silica-zirconia bead with a surface area in excess of 300 square meters per gram also functions as a most suitable adsorbent.

In order to promote indirect heat transfer from the gas in ducts 8 to the catalyst beds 10 the duct partitions 20—22 should be closely spaced. The spacing should preferably be of the order of one half inch, and in no event should exceed 1.5 inches. The length of the catalyst beds 10 should preferably be about 12 inches. The height (not shown in FIG. 1) of these beds may be from about 4 to 6 inches, preferably about 6 inches. These beds should be completely packed with catalyst. At an exhaust gas flow rate of about 100 cubic feet per minute (open throttle conditions), I have obtained satisfactory results at a pressure drop of about 3 inches of mercury across the catalyst bed. The thickness of the catalyst bed (i.e. the distance between the walls 24—26) is desirably about one half inch, so that for a muffler length of the order of 50 inches as many as about 50 of such catalyst beds and ducts may be mounted in parallel. The afterburner of my invention may be made of steel or, more preferably, stainless steel.

It will be understood that the foregoing detailed description is given merely by way of illustration and that many variations can be made therein without departing from the spirit of this invention.

Having thus described this invention, what I desire to secure and claim by Letters Patent is:

1. In a method for effecting catalytic oxidation of combustible components contained in the exhaust gas of an internal combustion engine, the improvement which comprises passing said exhaust gas under conditions of high temperature alongside and in indirect heat exchange relationship with a plurality of beds having contained therein porous adsorbent combustion catalyst to remove heat from said exhaust gas and transfer the same to said beds of catalyst and thereby to increase the temperature of said catalyst to a point above which catalytic oxidation of said combustible components is effected, thereafter reversing the direction of flow of said exhaust gas and passing the same through said beds of heated catalyst to adsorb said combustible components on the portion of said catalyst with which said exhaust gas makes initial contact until the portion of said catalyst, most remote from the point of introduction of said exhaust gas to said beds, reaches operation temperature, stripping said adsorbed combustible components from the initial portion of said catalyst beds by the flow of hot exhaust gas therethrough, passing the resulting stream of hot exhaust gas containing released combustible components to the remote portion of said catalyst beds and therein catalytically oxidizing said combustible components contained in said gas and discharging the resulting gas stream containing oxidized combustible components from said beds to the atmosphere.

2. The method of claim 1 wherein said catalyst beds contain in the initial portion thereof an adsorbent material capable of holding said combustible components as sorbate until the remote portion of said beds reaches its operating temperature.

3. The method of claim 2 wherein said adsorbent comprises an aluminosilicate molecular sieve.

References Cited in the file of this patent
UNITED STATES PATENTS

| | | |
|---|---|---|
| 1,402,814 | Wachtel | Jan. 10, 1922 |
| 2,127,561 | Herrmann | Aug. 23, 1938 |
| 2,942,932 | Elliott | June 28, 1960 |